(12) United States Patent
Trabert et al.

(10) Patent No.: US 6,912,104 B2
(45) Date of Patent: Jun. 28, 2005

(54) TIMING BASED SERVO PATTERN INCORPORATING BAND ENCODING

(75) Inventors: Steven G. Trabert, Boulder, CO (US); Matthew P. Wojciechowski, Westminster, CO (US)

(73) Assignee: Storage Technology Corporation, Louisville, CO (US)

( * ) Notice: Subject to any disclaimer, the term of this patent is extended or adjusted under 35 U.S.C. 154(b) by 429 days.

(21) Appl. No.: 10/136,981

(22) Filed: Apr. 30, 2002

(65) Prior Publication Data
US 2004/0032685 A1 Feb. 19, 2004

(51) Int. Cl.[7] ............................................. G11B 5/584
(52) U.S. Cl. ................................. 360/77.12; 360/72.2
(58) Field of Search ............................. 360/77.12, 75, 360/72.2, 48, 46, 53, 69, 70

(56) References Cited

U.S. PATENT DOCUMENTS

| | | | | |
|---|---|---|---|---|
| 4,858,039 A | * | 8/1989 | Mintzlaff | 360/72.2 |
| 5,229,895 A | | 7/1993 | Schwarz et al. | 360/77.12 |
| 5,262,908 A | | 11/1993 | Iwamatsu et al. | 360/77.12 |
| 5,426,538 A | * | 6/1995 | Kanota et al. | 360/48 |
| 5,596,457 A | * | 1/1997 | Kanota et al. | 360/48 |
| 5,602,703 A | | 2/1997 | Moore et al. | 360/121 |
| 5,949,597 A | * | 9/1999 | Pahr | 360/46 |
| 5,973,868 A | * | 10/1999 | Kanota et al. | 360/48 |
| 6,018,429 A | | 1/2000 | Mantey et al. | |
| 6,021,013 A | | 2/2000 | Albrecht et al. | |
| 6,031,673 A | * | 2/2000 | Fasen et al. | 360/53 |
| 6,134,070 A | | 10/2000 | Tran et al. | 360/75 |
| 6,169,640 B1 | | 1/2001 | Fasen | 360/48 |
| 6,172,837 B1 | * | 1/2001 | Fasen | 360/75 |
| 6,411,460 B1 | * | 6/2002 | Fasen | 360/75 |
| 2003/0099059 A1 | | 5/2003 | Nakao | |
| 2003/0123181 A1 | | 7/2003 | Hennecken et al. | |
| 2003/0151844 A1 | | 8/2003 | Eaton et al. | |

FOREIGN PATENT DOCUMENTS

EP           0 940 812 A2     9/1999

OTHER PUBLICATIONS

Barrett et al., "Timing–Based Track–Following Servo for Linear Tape Systems", IEEE Transacti ns n Magnetics, vol. 34, No. 4, Jul. 1998, pp. 1872–1877.

\* cited by examiner

Primary Examiner—David Hudspeth
Assistant Examiner—Fred F. Tzeng
(74) Attorney, Agent, or Firm—Yee & Associates, P.C.

(57) ABSTRACT

Identification of servo tracks is provided by adding one or more additional symbols to the write elements of at least some tracks on a servo recording head. The additional symbols are ignored for timing purposes, as they are not necessarily symmetrical, but the added symbols provide identification by their alterations on the otherwise identical patterns.

22 Claims, 13 Drawing Sheets

TIMING BASED SERVO PATTERN INCORPORATING BAND ENCODING

BACKGROUND OF THE INVENTION

1. Field of the Invention

This invention relates generally to recording and reading data from magnetic storage media and, more particularly, to servo control systems that maintain the position of a magnetic head relative to tracks in magnetic tapes.

2. Background of the Invention

As the magnetic storage of information becomes more sophisticated, greater amounts of data are packed into smaller volumes of space. In storing large amounts of data on a magnetic tape, multiple "tracks" of data are stored paralleling the length of the tape. The number of tracks that can be stored on a particular width of tape depends on the sensitivity of the technology used, but it is currently possible to have hundreds of tracks on a ½ inch wide magnetic tape.

A major hurdle in recording and reading data from these hundreds of tracks is the lateral movement of the tape media as it traverses the read/write head. This is overcome by manufacturing the tape with recorded tracks of servo information at various lateral locations across the tape. These servo tracks provide information that allow the servo mechanisms in a tape transport to correctly position the head with respect to the data tracks.

Figure 1:
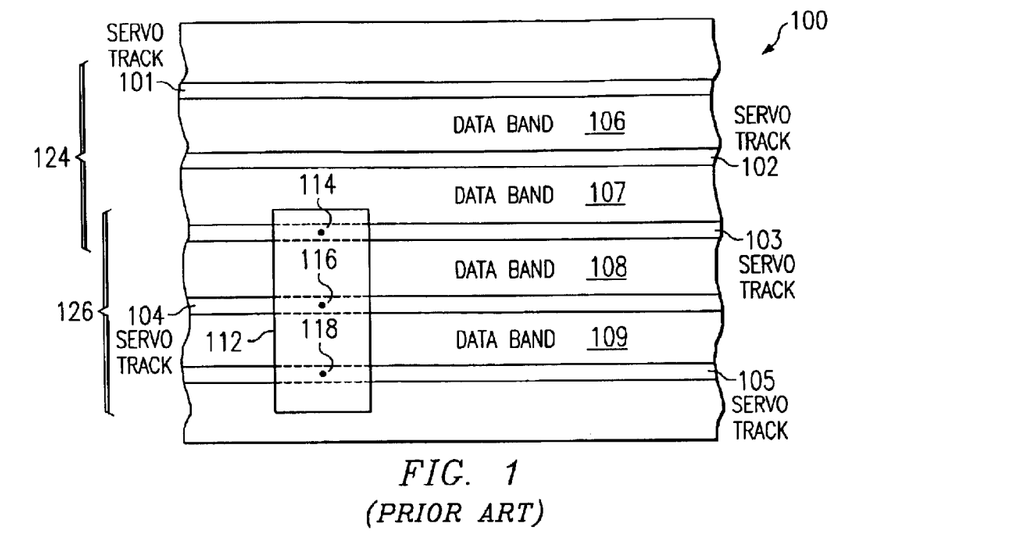
FIG. 1 shows a tape and a read/write head positioned to read the tape.

FIG. 1 shows a diagram of a tape and read/write head. Tape 100 has a number of servo tracks 101–105. Data is stored in bands 106–109 between servo tracks 101–105, with each data band containing a given number of tracks, depending on the technology. In these examples, read/write head 112 contains three servo read elements 114, 116, 118 and a number of data read/write elements that are not specifically shown; read/write head 112 can be positioned over an upper portion 124 or a lower portion 126 of tape 100. Read/write head 112 is made wider than the tape so that no matter what its position, the head 112 supports tape 100. Servo read elements 114, 116, 118 read the information from the servo tracks; from this, the servo mechanism can calculate any movements necessary to maintain the proper position of read/write head 112 with regard to tape 100.

The servo tracks, in addition to providing positioning information for the servo mechanisms, can be encoded to carry additional useful information, such as identifying the individual servo tracks and the current longitudinal position along the tape.

Figure 2:
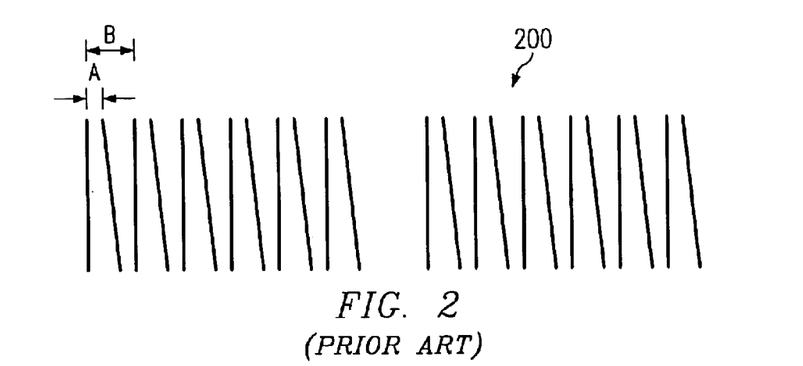
FIG. 2 shows one pattern for a timing based servo track.
Figure 3:
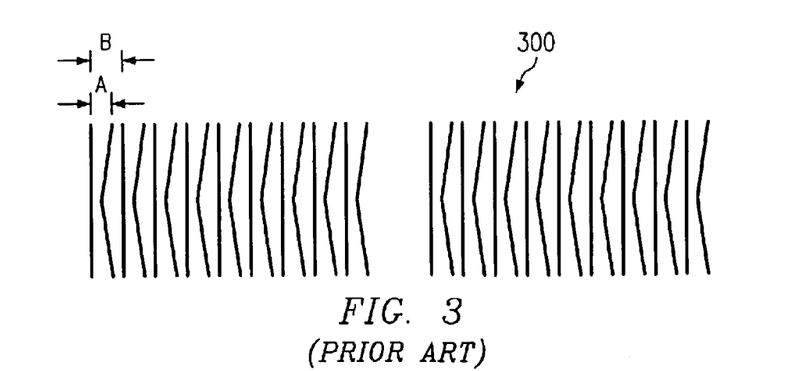
FIG. 3 shows an alternate pattern for a timing based servo track.

There are a number of different methods of coding information in the patterns written in the servo tracks. One very useful method is timing-based coding, as it provides a method of position sensing that is insensitive to reading speed. This method is discussed in U.S. Pat. No. 6,021,013, which is hereby incorporated by reference. In this patent, each servo track is written with a repeating cyclic sequence of two patterned lines whose separation from each other varies in a consistent manner across the width of the servo track, with periodic gaps in the pattern to serve as a starting point for the pattern. Two exemplary patterns 200 and 300 from this patent are reproduced in FIG. 2 and FIG. 3. The time A between the detection of two dissimilar lines is compared to the time B between the detection of two similar lines. The value of A:B reveals how far off center the servo read head is at the time of reading, and thus the amount of correction necessary to properly locate the read head. Using this ratio rather than distances between symbols allows for the fact that the tape can be moving at different speeds. Thus, it is possible to maintain a position over a given band of data.

Figure 4:
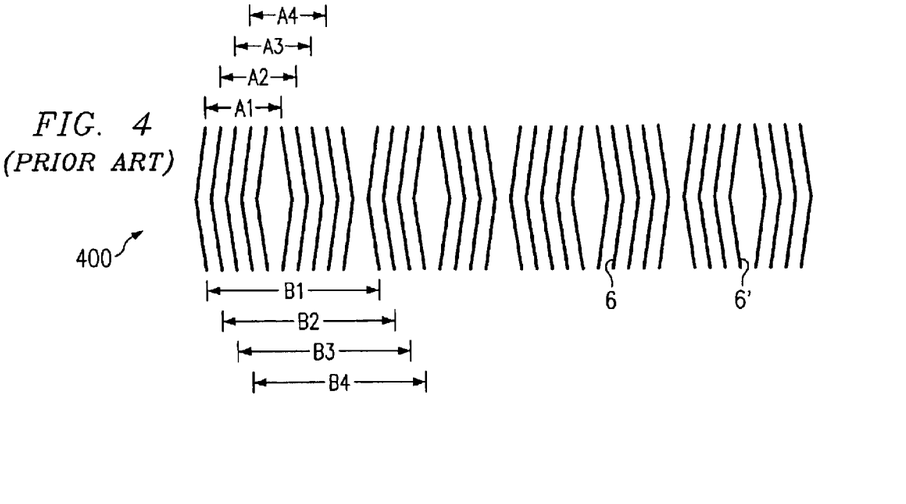
FIG. 4 shows an alternate nested pattern for a timing based servo track.
Figure 4A:
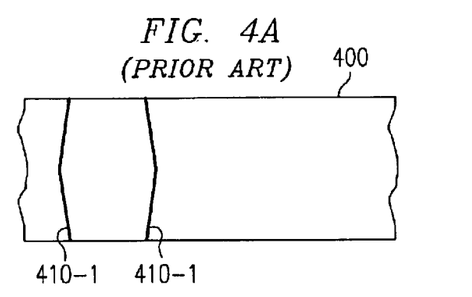
FIGS. 4A–I show the sequence as a nested pattern is created.

While the two patterns 200, 300 demonstrate the principles of timing-based servo patterns, it has been found that single comparisons of A and B are not enough for accurate measurements. Therefore, nested patterns, such as pattern 400 shown in FIG. 4, are more commonly used. Using a nested pattern of four chevrons, four measurements can be taken across a given length of tape; their averaged value of A:B is much more accurate. The detection of an expected sequence of stripes (generally, two sets of five followed by two sets of four) also provides an efficient means of error detection, as the software can immediately detect when an expected input is not found.

To provide the high accuracy necessary, the tape is recorded on a special servo-track machine. The first portion of the recording head contains an erase head, which erases the entire width of the tape, followed by a single-coil, multi-gap write element, capable of writing all servo tracks on a tape in one pass. Unlike normal data write elements, which are continuously powered and switch from one polarity to the opposite polarity repeatedly, the servo write element is switched on and off and normally writes in only one polarity. Additionally, the write element is patterned, so that each time it is powered, it produces an image on the tape of the patterned write element. By controlling the switching of the write element as the tape moves across the head, the pattern is repetitively written on each of the servo tracks. For a nested pattern, images of both the left and right component of a pattern are written simultaneously to maintain the accuracy.

Figure 4B:
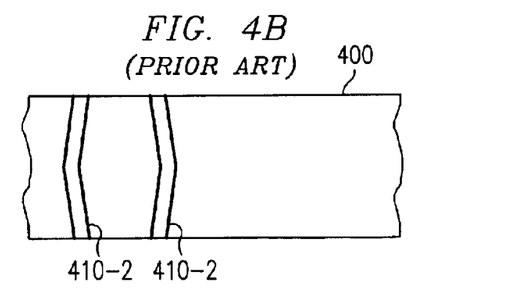
Figure 4C:
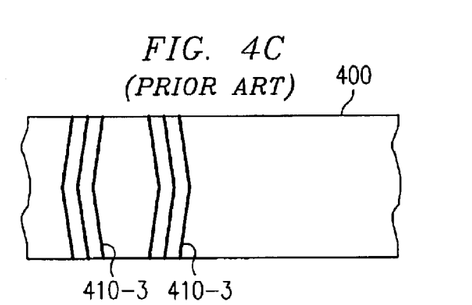
Figure 4D:
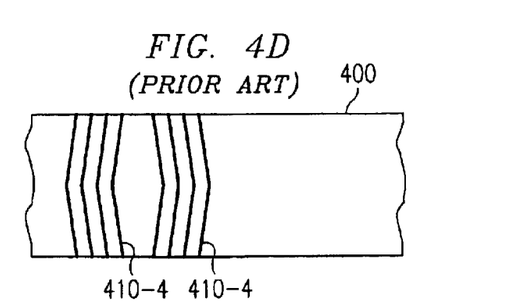
Figure 4E:
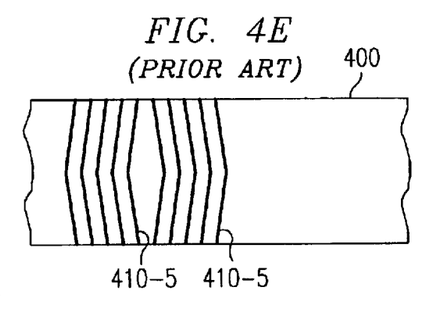
Figure 4F:
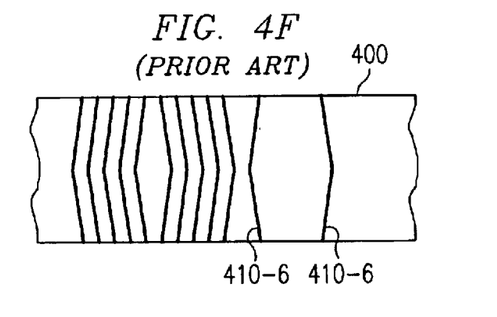
Figure 4G:
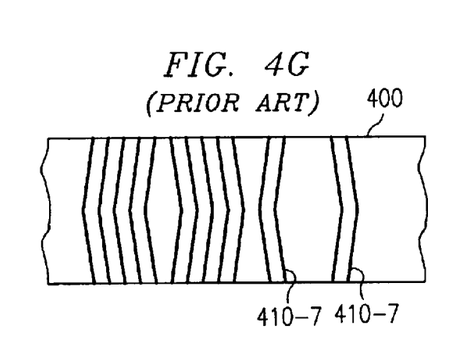
Figure 4H:
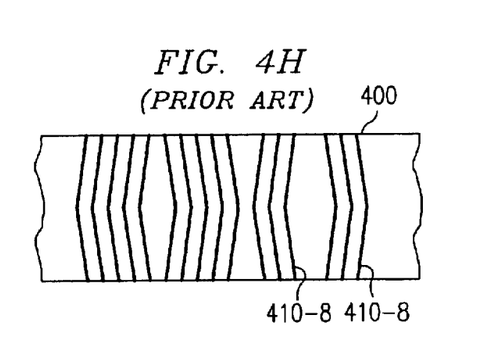
Figure 4I:
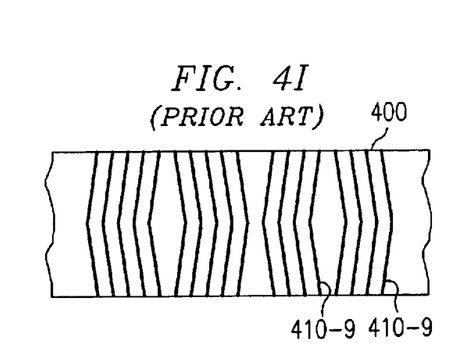
Figure 4J:
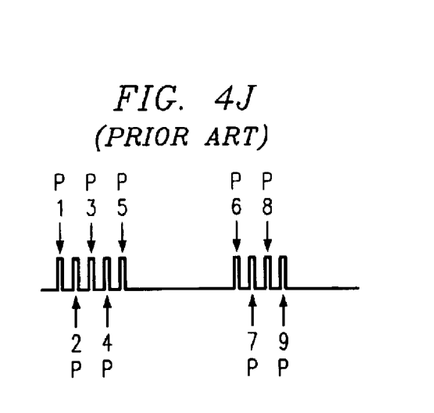
FIG. 4J shows the timing pattern for pulsing the write element to create this pattern.

Creation of the pattern shown in FIG. 4 is demonstrated in FIGS. 4A–J. In this example, the figures show the same section of the tape as it moves from right to left across the write head. The portion of the tape that appears white has already been erased. FIG. 4J is a timing pattern that shows when the write element is pulsed, while FIGS. 4A–I show the tape sequentially after each pulse. Looking at FIG. 4A, the first pulse P1 of the write element has produced an image of the pattern that is on the write element, creating the two-chevron pattern 410-1. FIG. 4B shows the tape after pulse P2 has written pattern 410-2, FIG. 4C shows it after pulse P3 has written pattern 410-3, FIG. 4D shows it after pulse P4 has written pattern 410-4, FIG. 4E shows it after pulse P5 has written pattern 410-5. After the initial five pulses, the write element is not pulsed again until the initial five nested chevrons 410-1 through 410-5 have all passed the write element, then four further pulses P6–P9 write the pattern of four nested chevrons 410-6 through 410-7. The process will continue until all servo patterns are written along the entire length of a tape.

In order for the timing based servo patterns to work properly, several factors that can adversely affect the outcome must be taken into account. First, the servo read elements must be much narrower than the servo track, so that each servo read element detects only a narrow width of the pattern created. This serves to minimize tracking errors due to false position signals. Secondly, all of the pattern lines are written using a uni-polar write current and the timing is measured only between magnetic flux transitions having the same polarity (e.g., always timing the transition at the beginning of a line). Variations in the write head or the writing process, as well as other difficulties can cause apparent shifts in the timing of transitions having opposite polarities, so opposite transitions are never compared.

In order to position the read head 112 of FIG. 1 over the correct band of data 106, 107, 108, 109, different patterns are used for different servo tracks. For example, if pattern 200 is used on three servo tracks 101, 102, 105 of FIG. 1, and pattern 300 is used on servo tracks 103 and 104, then by reading two adjacent servo tracks and recognizing their patterns, it is possible to determine which data band is between the two servo tracks, using the following Table 1:

| Upper servo pattern | Lower servo pattern | Data band |
|---|---|---|
| 200 | 200 | 106 |
| 200 | 300 | 107 |
| 300 | 300 | 108 |
| 300 | 200 | 109 |

Within the servo tracks, additional information, such as the longitudinal location, can be encoded by varying specific portions of the pattern, such as the distance between successive groupings of the pattern. Because servo tracks are typically recorded at a much lower density than the data tracks, they can be read at high speeds. This ability to read longitudinal data at high speeds makes searches much more efficient.

While the beauty of a timing-based servo system lies in the fact that it utilizes comparisons rather than individual symbols, this very concept also confines it. Since meaning is only carried in comparative relationships, the density of information is necessarily low. It would be desirable to carry additional information in the timing pattern without destroying the timing pattern itself.

Figure 15:
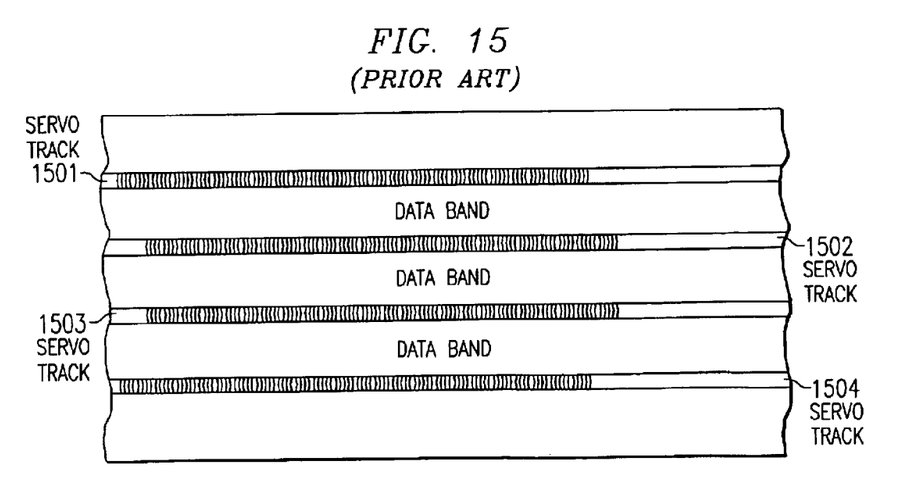
FIG. 15 shows a prior art solution to identifying the servo tracks.

One solution that has been disclosed is U.S. Pat. No. 6,169,640. This patent discloses using, for example, four servo tracks on which the timing patterns are identical, but not synchronized with each other. Rather, as seen in FIG. 15, the two inner tracks 1502 and 1503 are offset a given amount from the two outer tracks 1501 and 1504. The result is that each adjacent pair of servo tracks exhibits a different timing relationship as compared to the other pairs of servo tracks, providing identification of the servo tracks by this offset. However, this scheme comes with its own drawback. Since the servo tracks are not synchronized with each other, the software must be concerned with phase differences between the servo tracks when creating a position error signal. It would be beneficial to identify the tracks without losing synchronicity.

SUMMARY OF THE INVENTION

Rather than the simple nested patterns currently used, the present invention adds additional symbols to the pattern of at least some of the tracks written by the servo write element. The patterns still contain only the two azimuthally inclined symbols of the prior art, but the servo patterns created are no longer symmetrical. The lack of symmetry means that not all symbols in the pattern will be used for timing purposes; however, they can be used to identify the servo track, and hence the data bands between the servo tracks. In a preferred embodiment, spaces between the symbols separate the symbols into groups, the number of symbols in each group defines the coding for the tracks.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

In the following discussion of the servo patterns, a grid is shown above many of the patterns to mark positions along the tape. These grids are, of course, not present on the tape, but are shown for ease of understanding only.

Figure 5A:
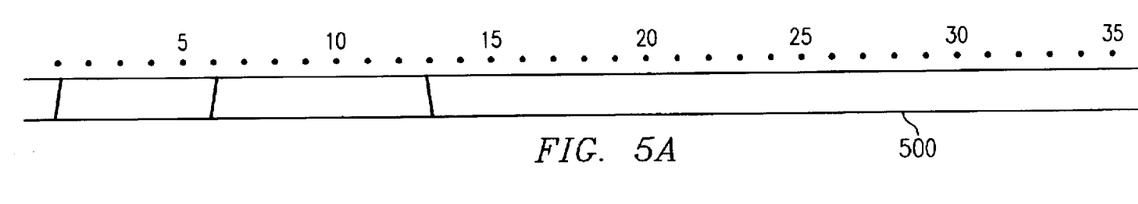
FIGS. 5A–I show writing a first servo track according to a first embodiment of the invention and FIG. 5J is the timing pattern.

In FIGS. 5A–I and 6A–I, we see two separate tracks on a tape as they are written with their respective patterns 500 and 600. The patterns of the write element extend across the entire width of the servo track. The first figure for each track is thus the image that will be created after the first pulse of the write element. In this embodiment, the servo track 500, seen in FIG. 5A, produces right-inclined lines at positions 1 and 6 and a left-inclined line at position 13, while the servo track 600, seen in FIG. 6A, produces a right-inclined line at position 1 and left-inclined lines at positions 8 and 13.

Figures 5B, 5C:
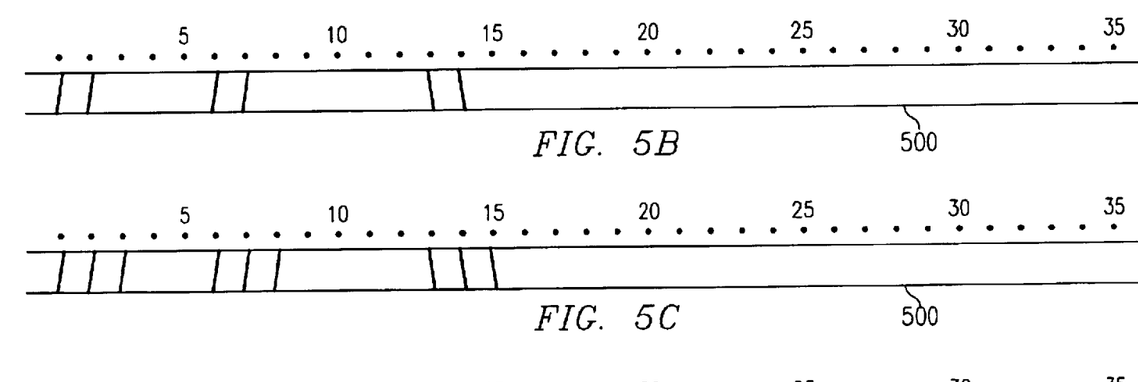
Figure 5D:
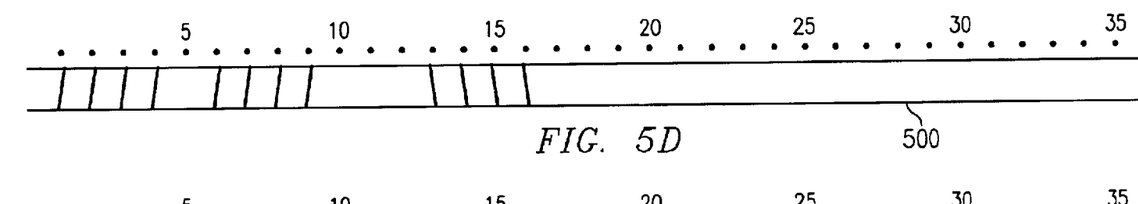
Figure 5E:
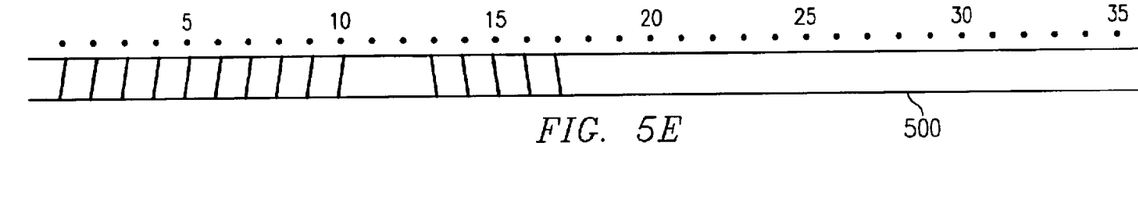
Figure 5F:
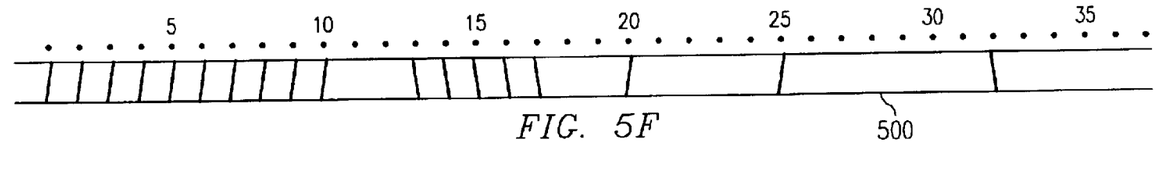
Figure 5G:
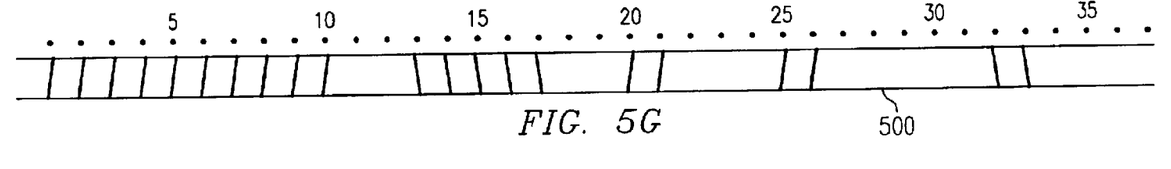
Figure 5H:
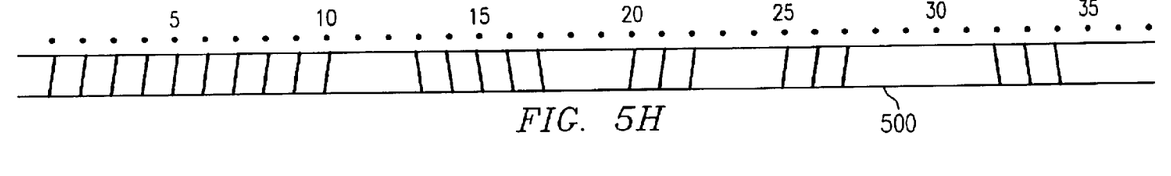
Figure 5I:
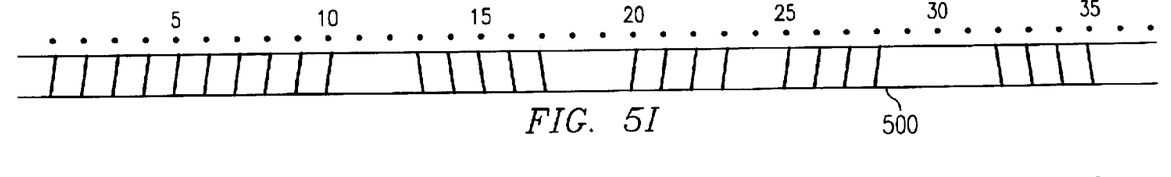
Figure 5J:
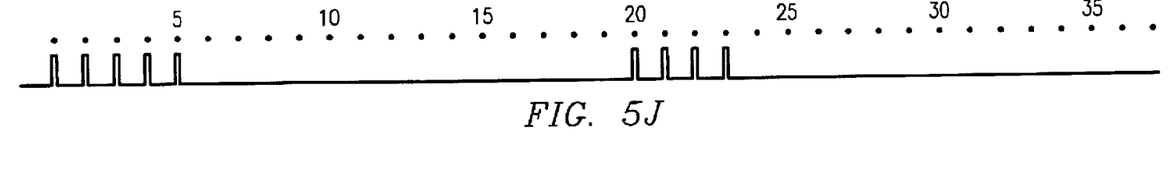
Figure 6A:
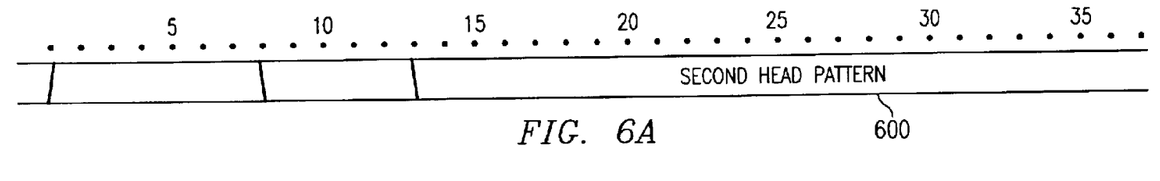
FIGS. 6A–I show writing a second servo track according to a first embodiment of the invention, while FIG. 6J again shows the timing pattern.
Figure 6B:
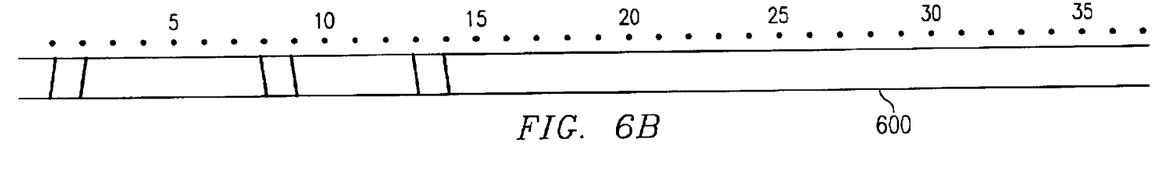
Figure 6C:
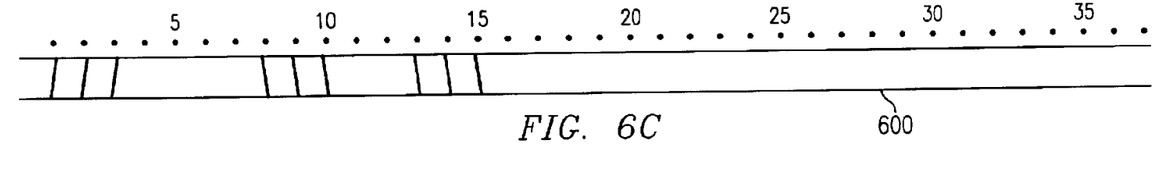
Figure 6D:
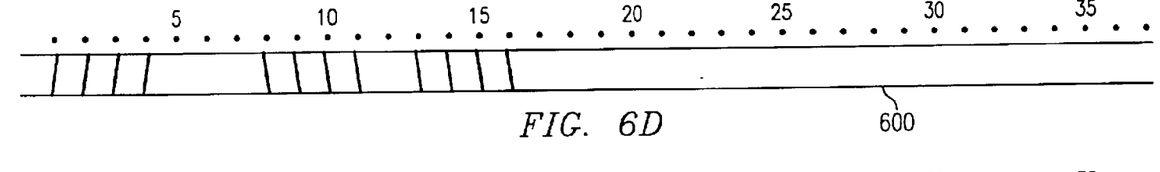
Figure 6E:
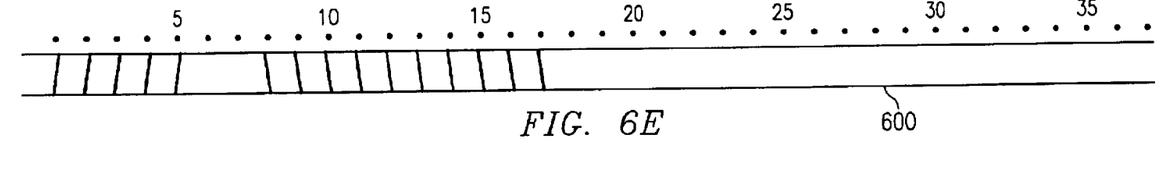
Figure 6F:
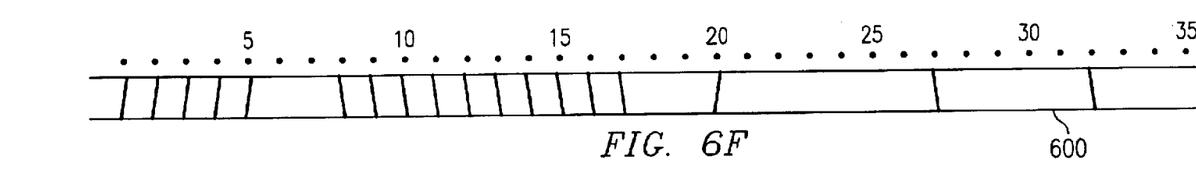
Figure 6G:
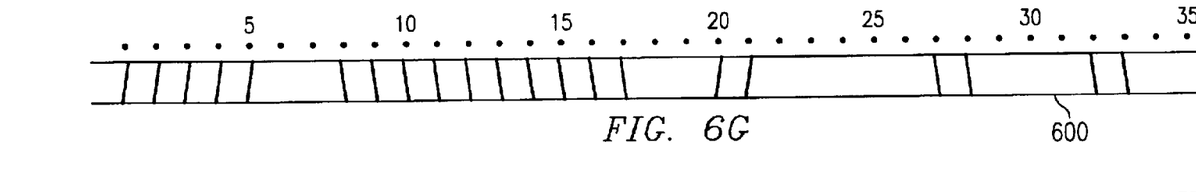
Figure 6H:
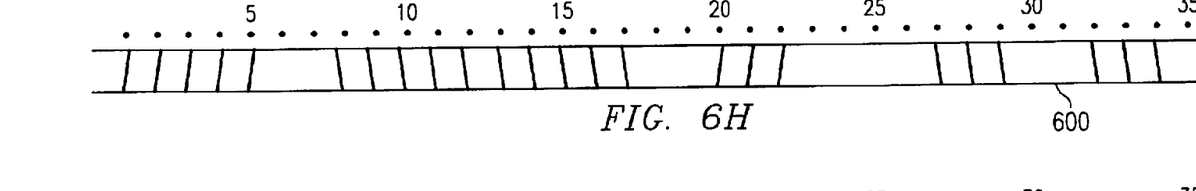
Figure 6I:
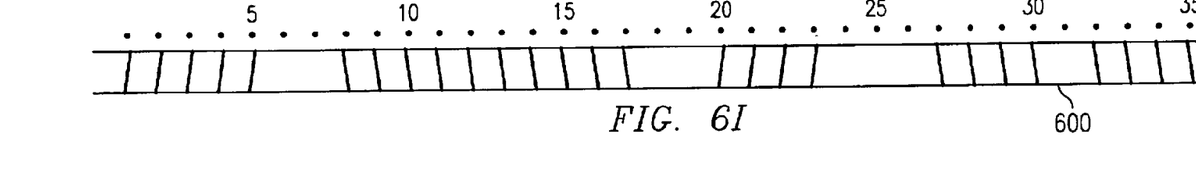
Figure 6J:
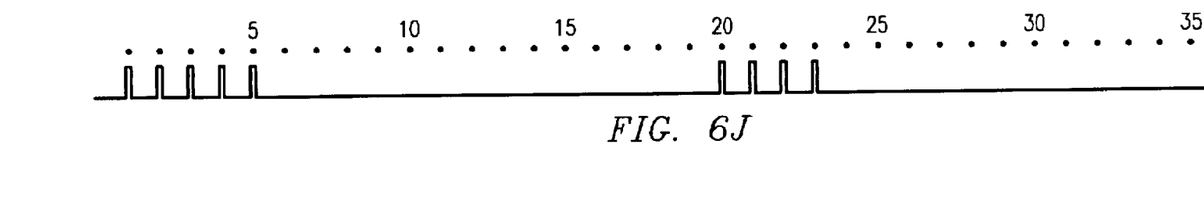

In FIGS. 5B and 6B, the write element has pulsed again one position later on the tape, forming a second image of the write element, displaced from the first by one position. In the following FIGS. 5C–I and 6C–I, the servo pattern is shown at each step as it is created using the timing diagram of FIGS. 5J and 6J, with a first set of five pulses followed by a longer movement of the tape, then a second set of four pulses, just as in the previous example. Looking at the groupings of the symbols and the number of symbols in each group, the first track would decode as 10, 5, 4, 4, 4, while the second track would decode as 5, 10, 4, 4, 4.

Figure 7A:
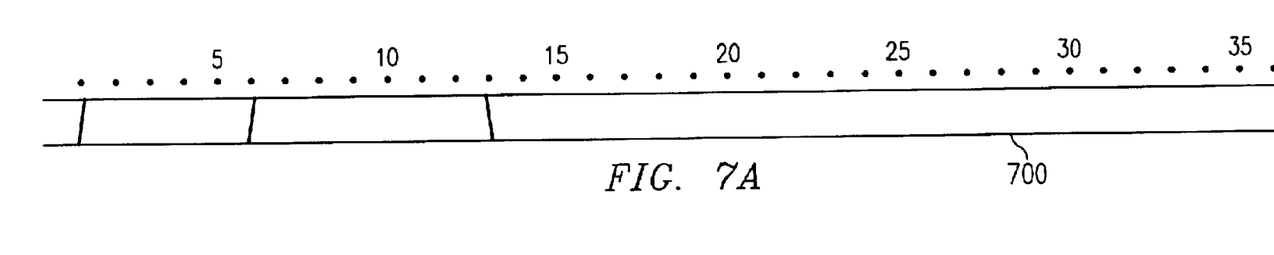
FIGS. 7A–C show writing a first servo track according to a second embodiment of the invention, with the process shown respectively after one pulse, five pulses, and nine pulses.
Figure 7B:
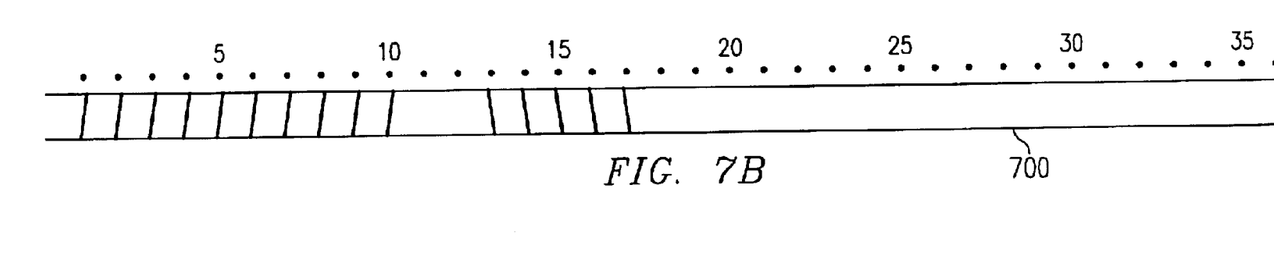
Figure 7C:
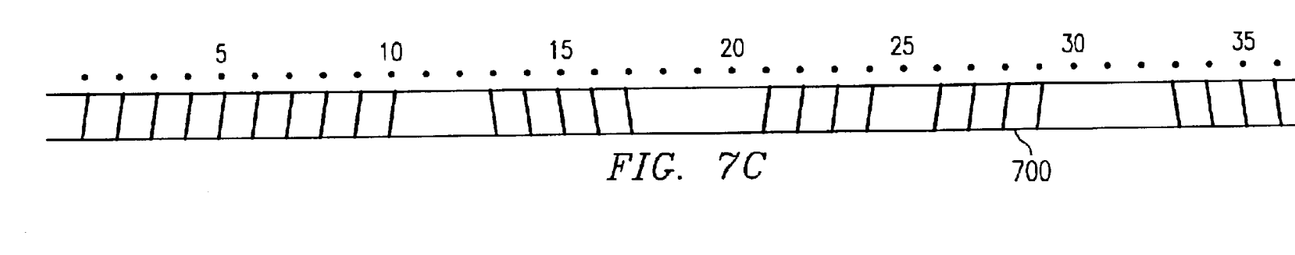
Figure 7D:
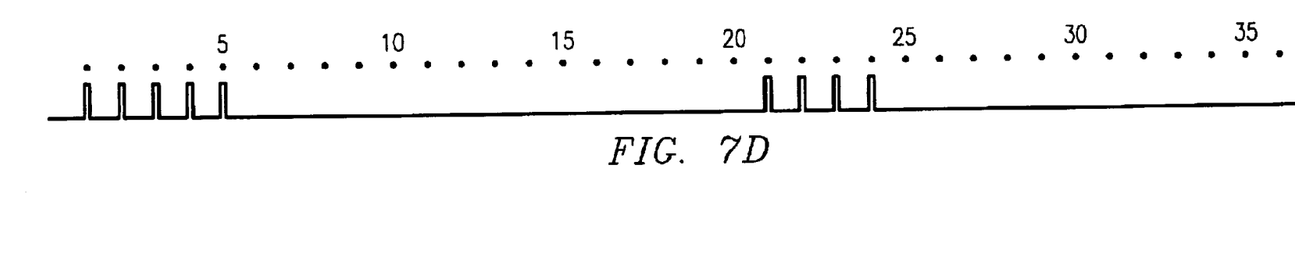
FIG. 7D shows the timing pattern.
Figure 8A:
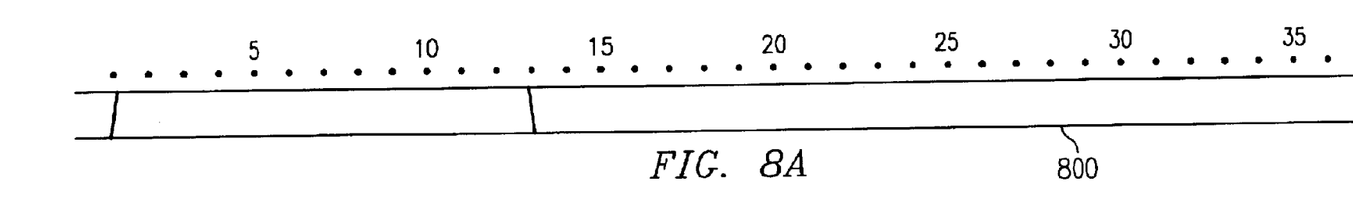
FIGS. 8A–C show writing a second servo track according to a second embodiment of the invention, with the process shown respectively after one pulse, five pulses, and nine pulses.
Figure 8B:
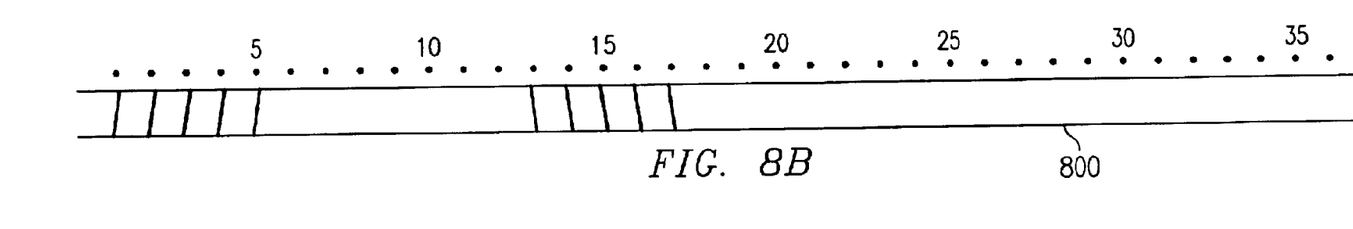
Figure 8C:
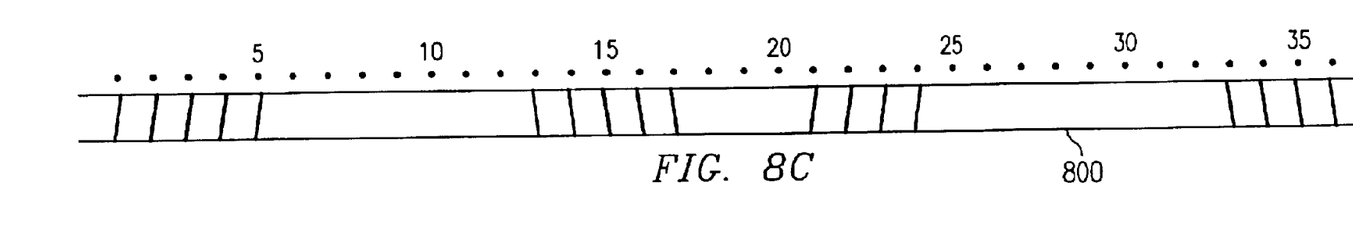
Figure 8D:
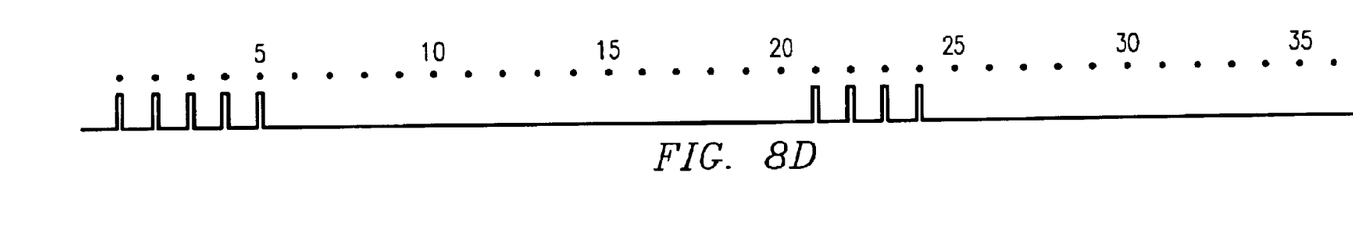
FIG. 8D is the timing pattern.

An alternate embodiment of the servo track coding is shown in FIGS. 7A–C and 8A–C on servo tracks 700 and 800 respectively, following the timing patterns reproduced as FIGS. 7D and 8D. As seen in FIGS. 7A and 8A, only track 700 contains a third symbol in its patterned write element. FIGS. 7B and 8B show the partial patterns after five pulses; FIG. 7C and 8C show the tracks 700 and 800 after the tape is advanced and a further four pulses. In this embodiment, track 700 decodes as 10, 5, 4, 4, 4 and track 800 decodes as 5, 5, 4, 4.

Figure 9A:
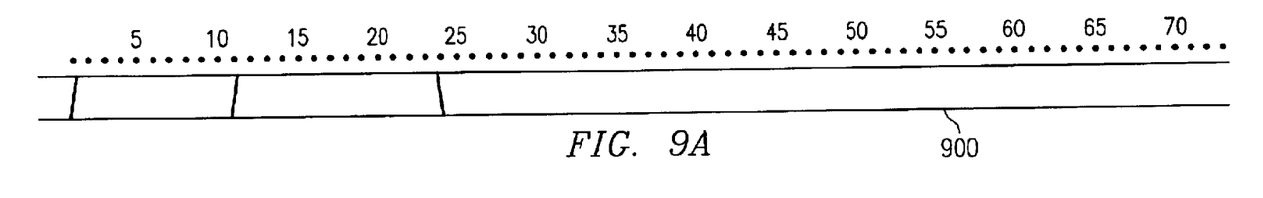
FIGS. 9A–C show writing a first servo track according to a third embodiment of the invention.
Figure 9B:
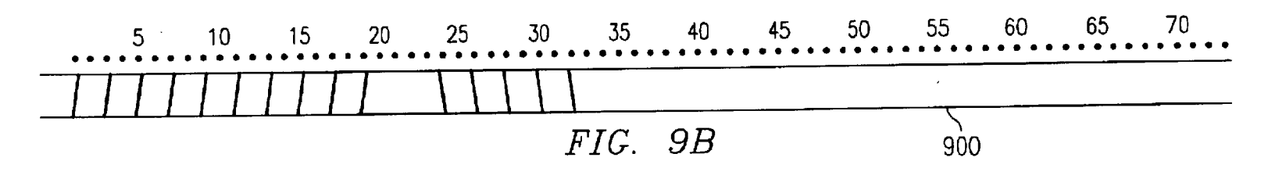
Figure 9C:
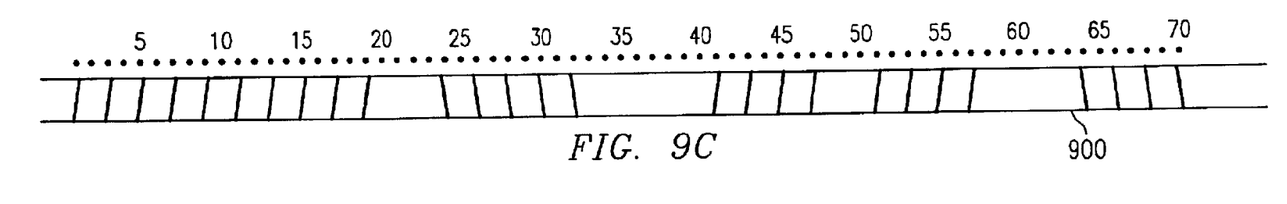
Figure 9D:
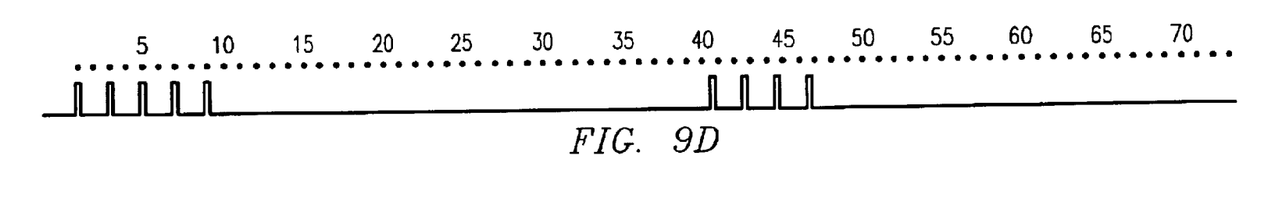
FIG. 9D is a corresponding timing pattern.
Figure 10A:
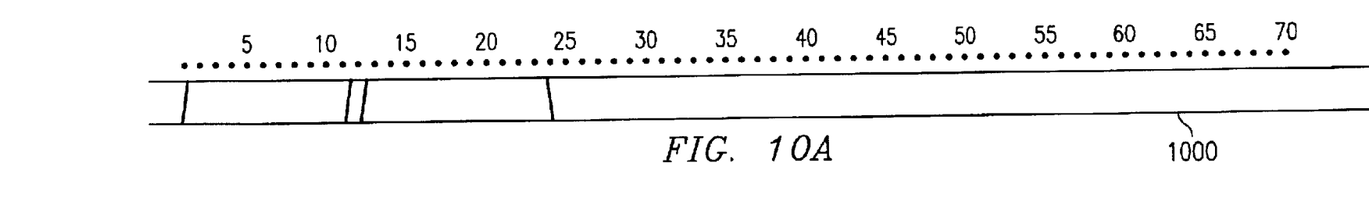
FIGS. 10A–C show writing a second servo track according to a third embodiment of the invention.
Figure 10B:
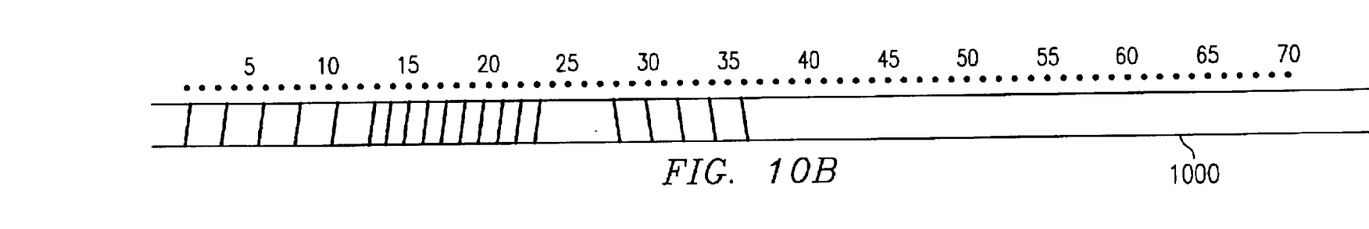
Figure 10C:
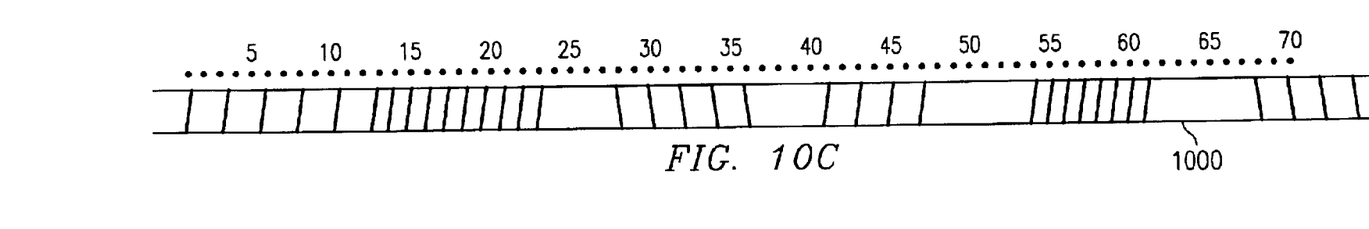
Figure 10D:
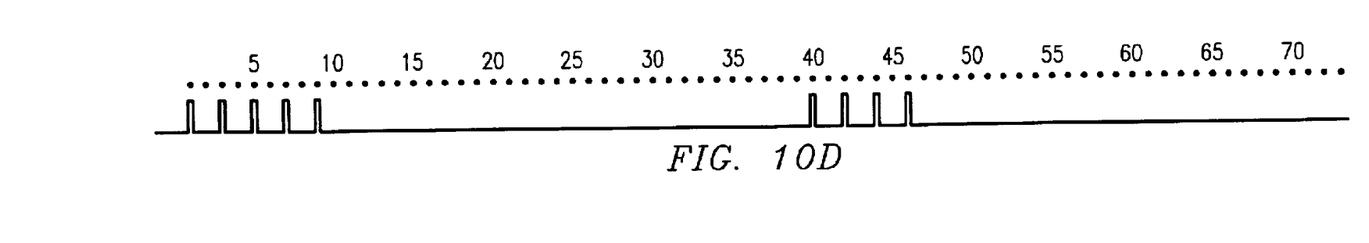
FIG. 10D is a corresponding timing pattern.

In a further alternate embodiment, the coding of a track lies not in the number of symbols in each group, but in how closely the transitions are spaced. FIGS. 9A and 10A show embodiments of the write element patterns for servo tracks 900 and 1000 respectively. Both tracks 900 and 1000 contain a right-inclined line at positions 1 and 11 and a left-inclined line at position 24, but only track 1000 has a symbol at position 12. The timing for this embodiment, shown in FIGS. 9D and 10D, is slightly different from the previous versions, as the tape is allowed to move two positions between adjacent pulsing of the erase heads. In FIGS. 9B and B, we see the pattern on tracks 900 and 1000 created by the first five pulses, FIGS. 9C and 10C show the pattern on tracks 900 and 1000 after advancing the tape and an additional four pulses. As a consequence of the additional symbol, the second track contains a much higher frequency of symbols in some portions than does the first track. This higher frequency can be detected by the servo hardware and used as identification.

Figure 11:
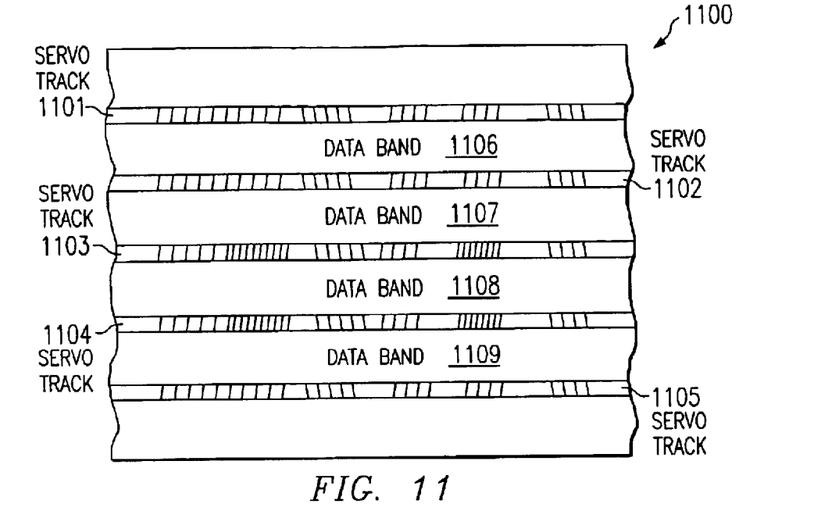
FIG. 11 shows a tape encoded with two servo patterns according to the third embodiment above.

In FIG. 11, we see a tape with five servo tracks 1101, 1102, 1103, 1104, and 1105 and four data bands 1106, 1107. 1108, and 1109 containing an unknown number of data tracks. Tracks 1101, 1102, and 1105 contain the pattern shown in track 900 of FIG. 9C, while tracks 1103 and 1104 contain the pattern shown in track 1000 of FIG. 10C. Position of the head laterally across the tape can be determined by reading any two adjacent servo tracks and using the following Table 2:

| Upper servo pattern | Lower servo pattern | Data band |
|---|---|---|
| 900 | 900 | 1106 |
| 900 | 1000 | 1107 |
| 1000 | 1000 | 1108 |
| 1000 | 900 | 1109 |

Figure 12A:
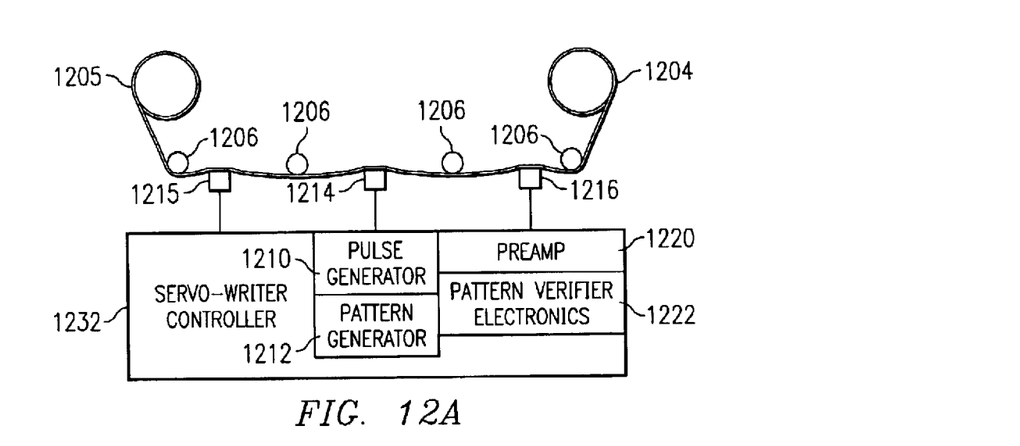
FIG. 12A shows a simplified diagram of a servo writer system that can implement the innovative system of servo tracks.
Figure 13:
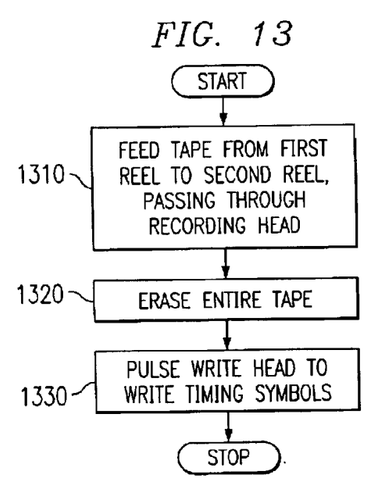
FIG. 13 gives a flow for creating the servo tracks on a tape.

FIG. 12A is a simplified version of a servo writer that can implement the innovative system of servo tracks, while FIG. 13 gives a flow for creating the tape. These figures will now be discussed in terms of the overall flow. The tape runs between reel 1205 and reel 1204. Tensioners 1206 help keep a constant tension on the tape for smoother operation. Erase head 1215 continuously erases the tape, followed by write head 1214, which is pulsed to write the pattern, and read head 1216, which verifies that the pattern was correctly written. Controller 1232 controls the movement of the reels 1204 and 1205, as well as the erase head 1215, write head 1214 and read head 1216. In writing servo tracks to a tape, the tape moves from reel 1205 to reel 1204 as all servo tracks are written in one pass (step 1310). As the tape moves, it is first erased (step 1320), then the write head is pulsed repeatedly, each time creating one copy of each servo track's pattern. The writing of this repetitive pattern creates the servo track(step 1330). On the hardware side, pattern generator 1212 processes the given pattern and controls the pulse generator 1210 so that the write head 1214 is driven to create the desired pattern. Once the signal is written, it is verified by reading the signal, amplifying the signal in preamp 1220 and sending it to the pattern verifier electronics 1222. Once the entire tape has been processed, the tape is ready to use for data storage.

Figure 12B:
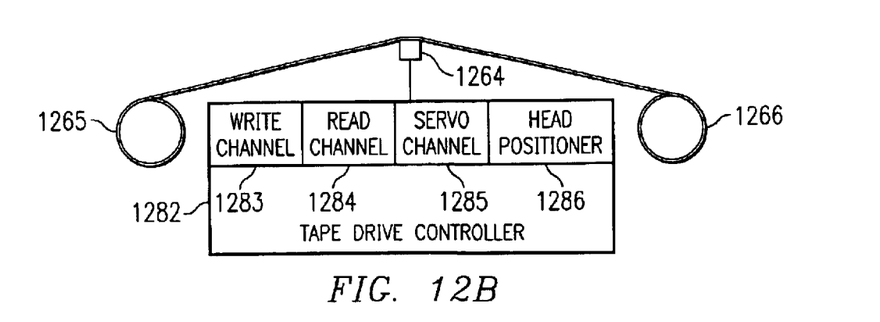
FIG. 12B shows a simplified diagram of a tape drive system that can use the innovative system of servo tracks.
Figure 14:
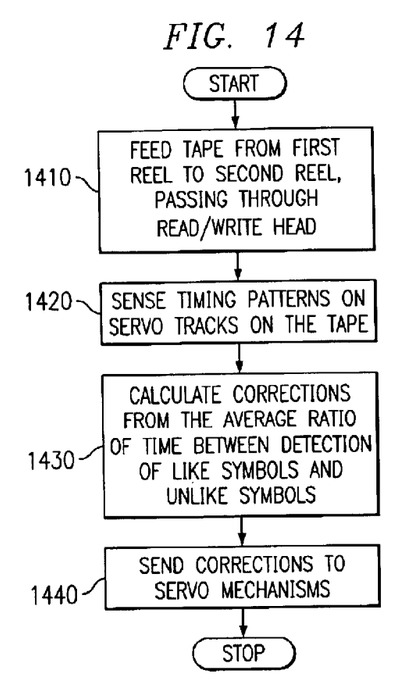
FIG. 14 gives a flow for using the tape.

FIG. 12B shows a tape drive and tape that is being used for data storage, while FIG. 14 shows a flow chart for the tracking mechanisms. The tape is connected so that it runs from a first reel 1265 to a second reel 1266, passing across read/write head 1264 (step 1410). Tape drive controller 1282 controls the movement of reels 1265 and 1266. The controller 1282 contains write channel 1283 and read channel 1284, used to control the activity of read/write head 1264, servo channel 1285 that carries signals from the servo read heads, and head positioner 1286, which controls the servo mechanisms (not specifically shown) by which the lateral movement of the head is controlled. Whether the tape is being written to or read from, the servo tracks are read and their patterns sensed (step 1420). The times between detection of like symbols is measured, as are the times between detection of mated pairs of unlike symbols; average times are calculated (step 1430). From the calculations, corrections are figured and sent to the servo mechanisms to act upon (step 1440).

The simple innovation disclosed in this application provides the possibility of increasing the efficiency of information stored in the servo tracks by allowing the track identification to be stored in additional data other than the timing portion.

The description of the present invention has been presented for purposes of illustration and description, and is not intended to be exhaustive or limited to the invention in the form disclosed. Many modifications and variations will be apparent to those of ordinary skill in the art. The embodiments were chosen and described in order to best explain the principles of the invention, the practical application, and to enable others of ordinary skill in the art to understand the invention for various embodiments with various modifications as are suited to the particular use contemplated.

For instance, while tapes were disclosed having only specific combinations of two different servo patterns, any number or combination of servo patterns can be utilized.

Additionally, the use of patterned write heads has been disclosed for writing the servo patterns, but other methods can be devised that do not require the write heads to be patterned.

It is further noted that servo tracks can also be referred to as servo bands; the meaning is the same.

What is claimed is:

1. A write head for simultaneously writing a plurality of timing-based servo tracks, said patterned write head comprising:

a write element aligned to write a first set of first and second patterned symbols, which are different from each other, to a first servo track; and a write element aligned to write a second set of said first and said second patterned symbols to a second servo track;

wherein said first set of patterned symbols and said second set of patterned symbols are written simultaneously;

wherein a first portion of said first set and a first portion of said second set consist of at least one identical matched pair of said first patterned symbol and said second patterned symbol and said first portions are aligned to be written at the same longitudinal location; and wherein a second portion of said first set and a second portion of said second set contain unmatched ones of said first patterned symbol or unmatched ones of said second patterned symbol and said second portions contain either different ones of said first and second patterned lines or contain ones of said patterned lines written at different longitudinal points on said tape.

2. The write head of claim 1, wherein said first portion of said first set and said first portion of said second set form nested timing patterns.

3. The write head of claim 1, wherein said write head is patterned.

4. A method of recording servo patterns on a magnetic tape, comprising the steps of:

moving a tape from a first reel, over a read/write head, and onto a second reel;

erasing said tape; and simultaneously writing a first timing-based servo pattern to a first servo track and a second timing-based servo pattern to a second servo track, each of said timing-based servo patterns consisting of a repetitive sequence of a first patterned line and a second patterned line, said first and second patterned lines being different from each other;

wherein a first portion of said first timing-based servo pattern and a first portion of said second timing-based servo pattern each consists of an identical series of paired symbols, each of said paired symbols consisting of one of said first patterned line and one of said second patterned line that are aligned a fixed distance apart, with said first portions of said first and second servo patterns aligned to be written at the same longitudinal point on said tape;

wherein a second portion of said first timing-based servo pattern and a second portion of said second timing-based servo pattern each comprises a series of either an unmatched one of said first patterned line or an unmatched one of said second patterned line, said second portions of said first and second servo patterns containing either different ones of said first and second patterned lines or containing ones of said patterned lines aligned to be written at different longitudinal points on said tape.

5. The method of claim 4, wherein said first portions form nested timing patterns.

6. The method of claim 4, wherein a choice of patterned lines in said second portion provides identification of said servo tracks.

7. The method of claim 4, wherein a frequency of appearance of one of said patterned lines provides identification of said servo tracks.

8. A method of writing servo tracks, comprising the steps of:

creating a first servo track and a second servo track using a first symbol having a first azimuthal inclination and a second symbol having a second azimuthal inclination that is different from said first azimuthal inclination;

wherein first portions of said first servo track and of said second servo track contain matched pairs of said first symbol and said second symbol and are written identically and synchronously and second portions of said first servo track and of said second servo track contain unpaired ones of said first symbol or said second symbol;

wherein said second portion of said first servo track and second portion of said second servo track either contain different ones of said first and second symbols or are aligned to write said symbols at different longitudinal locations on said tape.

9. The method of claim 8, wherein said first portions of said first servo track and of said second servo track form nested timing patterns.

10. The method of claim 8, wherein said second portions of said first servo track and of said second servo track provide identification of said servo tracks.

11. The method of claim 8, wherein identification of said servo tracks is carried in the grouping of said first and said second symbols of said second portions.

12. The method of claim 8, wherein identification of said servo tracks is carried in the frequency of occurrence of said first and said second symbols in said second portion.

13. A method of detecting a servo pattern, comprising the steps of:

moving a tape from a first reel, over a read/write head, and onto a second reel;

sensing a plurality of first symbols that are azimuthally inclined in a first direction and a plurality of second symbols that are azimuthally inclined in a second direction, wherein said plurality of symbols are carried in a plurality of servo tracks on said tape;

within an occurrence of a pattern of said first and second symbols where n occurrences of said first symbol each are paired with respective occurrences of said second symbol, calculating a time A from the detection of each of said n occurrences of said first symbol and said respective occurrence of said second symbol;

calculating a time B from the detection of each of said n occurrences of said first symbol and an (n+1) occurrence of said first symbol;

calculating an average time A and an average time B for said n occurrences;

calculating corrections in the motion of said read/write head according to the ratio (average distance A): (average distance B);

wherein said calculating steps are performed using paired occurrences of said first and said second symbol that are recorded at identical longitudinal locations on each of said plurality of servo tracks;

wherein remaining occurrences of said first or said second symbols are used to identify said servo tracks.

14. The method of claim 13, wherein identification of said servo tracks is carried in the grouping of said first set and said second of symbols.

15. The method of claim 13, wherein identification of said servo tracks is carried in the frequency of occurrence of said first and said second symbols.

16. A method of controlling a tape drive, said method comprising:

within a given repetition of a servo pattern:

identifying ones of a first symbol that have a respective, paired occurrence of a second symbol;

using said ones of said first symbol that have a respective, paired occurrence of said second symbol to determine lateral position on a tape; and using ones of said first and second symbols that do not have a respective, paired occurrence of the other symbol for track identification.

17. A recording media on which information can be recorded and stored, said recording media comprising:
- a surface capable of being encoded;
- a first servo track containing a first timing-based servo pattern written on said surface;
- a second servo track containing a second timing-based servo pattern written on said surface, said first and second servo tracks being at different lateral positions on said surface;
- said first timing-based servo pattern being formed of a first repeating cyclic sequence of first and second patterned lines, said first and second patterned lines being different from each other;
- said second timing-based servo pattern being formed of a second repeating cyclic sequence of said first and said second patterned lines;
- wherein a first section of said first repeating cyclic sequence and a first section of said second repeating cyclic sequence each contain ones of said first patterned lines that are paired with ones of said second patterned lines, each pair of first and second patterned lines having a fixed distance between said first patterned line and said second patterned line; and
- wherein, along the entire length of said tape, said first section of said first repeating cyclic sequence is located at a same longitudinal location on said tape as said first section of said second repeating cyclic sequence;
- wherein a second section of said first repeating cyclic sequence is different from a second section of said second repeating cyclic sequence in either a symbol used or in a longitudinal location at which a symbol is written.

18. The recording media of claim 17, wherein said matched pairs of said first and second patterned lines form nested timing patterns.

19. The recording media of claim 17, wherein said second sections of said first and second repeating cyclic sequences provide identification for said servo tracks and for data bands.

20. The recording media of claim 19, wherein the number of occurrences of said first or said second patterned lines in said second section of said first and said second servo patterns provides an identification for said servo tracks.

21. The recording media of claim 17, wherein the frequency of said first or said second patterned lines in said second section of said first and said second servo patterns provides an identification for said servo tracks.

22. The recording media of claim 17, wherein said servo tracks can be read at high speeds.

* * * * *